(12) United States Patent
Goto et al.

(10) Patent No.: US 9,334,812 B2
(45) Date of Patent: May 10, 2016

(54) FUEL SUPPLY CONTROL SYSTEM FOR MULTI-FUEL INTERNAL COMBUSTION ENGINE

(75) Inventors: Isamu Goto, Shizuoka-ken (JP); Masahiko Masubuchi, Mishima (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 443 days.

(21) Appl. No.: 14/002,807

(22) PCT Filed: Mar. 4, 2011

(86) PCT No.: PCT/JP2011/055096
§ 371 (c)(1),
(2), (4) Date: Sep. 3, 2013

(87) PCT Pub. No.: WO2012/120598
PCT Pub. Date: Sep. 13, 2012

(65) Prior Publication Data
US 2013/0345950 A1 Dec. 26, 2013

(51) Int. Cl.
*G06F 7/00* (2006.01)
*G06F 17/00* (2006.01)
(Continued)

(52) U.S. Cl.
CPC .......... *F02D 19/0605* (2013.01); *F02D 19/061* (2013.01); *F02D 19/081* (2013.01); *F02D 35/023* (2013.01); *F02D 35/026* (2013.01); *F02D 41/0025* (2013.01); *F02D 19/0644* (2013.01); *F02D 19/0647* (2013.01); *F02D 19/0649* (2013.01); *F02D 19/10* (2013.01); *F02D 35/028* (2013.01); *F02D 41/3094* (2013.01); *Y02T 10/36* (2013.01); *Y02T 10/44* (2013.01)

(58) Field of Classification Search
USPC .......................... 701/104; 123/435, 575, 578
See application file for complete search history.

(56) References Cited

U.S. PATENT DOCUMENTS

| 6,994,077 B2 * | 2/2006 | Kobayashi ............ F02D 35/023 123/568.11 |
| 7,013,865 B2 * | 3/2006 | Nagai ................... F02D 35/023 123/305 |

(Continued)

FOREIGN PATENT DOCUMENTS

| CN | 1871416 | 11/2006 |
| JP | 8-158980 | 6/1996 |

(Continued)

*Primary Examiner* — Stephen K Cronin
*Assistant Examiner* — David Hamaoui
(74) *Attorney, Agent, or Firm* — Finnegan, Henderson, Farabow, Garrett & Dunner, LLP

(57) ABSTRACT

An object of the present invention is to restrain the emission amount of unburned fuel components while restraining the consumption of fuel with relatively high ignitability in a multi-fuel internal combustion engine. The present invention resides in such a fuel supply control system for a multi-fuel internal combustion engine that a first fuel with relatively high ignitability and a second fuel with relatively low ignitability are used as fuels and the first fuel is used as an ignition source to mixedly combust the first fuel and the second fuel, wherein a supply amount Qd of the first fuel is adjusted on the basis of a difference ΔRH between a first heat generation rate RHd which is a heat generation rate given when assuming that only the first fuel is combusted and an actual heat generation rate RHa which is a heat generation rate given when the fuels are actually combusted (S105 to 107, S109).

4 Claims, 5 Drawing Sheets

(51) Int. Cl.
  *F02D 19/06* (2006.01)
  *F02D 35/02* (2006.01)
  *F02D 41/00* (2006.01)
  *F02D 19/08* (2006.01)
  *F02D 41/30* (2006.01)
  *F02D 19/10* (2006.01)

(56) References Cited

U.S. PATENT DOCUMENTS

| | | | | |
|---|---|---|---|---|
| 7,325,529 B2 * | 2/2008 | Ancimer | ............ | F02B 23/0675 |
| | | | | 123/299 |
| 7,870,845 B2 * | 1/2011 | Sasaki | ................ | F02D 35/024 |
| | | | | 123/299 |
| 8,473,180 B2 * | 6/2013 | Wang | ...................... | F02D 19/08 |
| | | | | 123/299 |
| 8,869,754 B2 * | 10/2014 | Shimada | ................... | F01N 5/02 |
| | | | | 123/3 |
| 8,904,995 B2 * | 12/2014 | Nada | ................... | F02D 41/3035 |
| | | | | 123/299 |
| 2006/0288979 A1 | 12/2006 | Ancimer et al. | | |
| 2012/0143479 A1 * | 6/2012 | Nada | ................... | F02D 41/3029 |
| | | | | 701/104 |

FOREIGN PATENT DOCUMENTS

| | | |
|---|---|---|
| JP | 2001-355471 | 12/2001 |
| JP | 2007-170345 | 7/2007 |

\* cited by examiner

FUEL SUPPLY CONTROL SYSTEM FOR MULTI-FUEL INTERNAL COMBUSTION ENGINE

TECHNICAL FIELD

The present invention relates to a fuel supply control system for a multi-fuel internal combustion engine capable of mixedly combusting a plurality of types of fuels.

BACKGROUND ART

Conventionally, a multi-fuel internal combustion engine has been developed, which can be operated by mixedly combusting a plurality of types of fuels such as liquid fuels (for example, diesel oil, gasoline or the like) and gas fuels for example, compressed natural gas, hydrogen gas or the like). For example, Patent Document 1 discloses an auxiliary fuel ignition type gas engine in which diesel oil is used as an auxiliary fuel. In this auxiliary fuel ignition type gas engine, diesel oil is used as an ignition source, and diesel oil and natural gas are mixedly combusted.

PRECEDING TECHNICAL DOCUMENT

Patent Document

Patent Document 1: JP08-158980A.

SUMMARY OF THE INVENTION

Problem to Be Solved by the Invention

In the multi-fuel internal combustion engine, there is a case where fuels with relatively high ignitability are used as an ignition source to mixedly combust a plurality of types of fuels. In such a case, if fuels with relatively low ignitability are not combusted sufficiently, it is feared that the emission amount of unburned fuel components may be increased.

The present invention has been made taking the foregoing problem into consideration, an object of which is to restrain the emission amount of unburned fuel components while restraining the consumption of fuels with relatively high ignitability in a multi-fuel internal combustion engine.

Solution for the Problem

The present invention provides such a fuel supply control system for a multi-fuel internal combustion engine in which a first fuel with relatively high ignitability and a second fuel with relatively low ignitability are used as fuels and the first fuel is used as an ignition source to mixedly combust the first fuel and the second fuel, wherein a supply amount of the first fuel is adjusted on the basis of a difference between a first heat generation rate, which is a heat generation rate given when assuming that only the first fuel is combusted, and an actual heat generation rate, which is a heat generation rate given when the fuels are actually combusted.

To be more specific, the fuel supply control system for the multi-fuel internal combustion engine according to the present invention resides in a fuel supply control system for a multi-fuel internal combustion engine in which a first fuel with relatively high ignitability and a second fuel with relatively low ignitability are used as fuels and the first fuel is used as an ignition source to mixedly combust the first fuel and the second fuel, the fuel supply control system for the multi-fuel internal combustion engine comprising:

a first fuel supply unit which supplies the first fuel to the multi-fuel internal combustion engine;
a second fuel supply unit which supplies the second fuel to the multi-fuel internal combustion engine;
a first heat generation rate estimating unit which estimates a first heat generation rate, the first heat generation rate being a heat generation rate given when assuming that only the first fuel supplied from the first fuel supply unit is combusted in the multi-fuel internal combustion engine;
an actual heat generation rate calculating unit which calculates an actual heat generation rate, the actual heat generation rate being a heat generation rate given when the fuels are actually combusted in the multi-fuel internal combustion engine; and
a first fuel supply amount adjusting unit which adjusts an amount of the first fuel supplied from the first fuel supply unit to the multi-fuel internal combustion engine so that a difference between the actual heat generation rate calculated by the actual heat generation rate calculating unit and the first heat generation rate estimated by the first heat generation rate estimating unit results in a predetermined target value.

If the supply amount of the first fuel to the multi-fuel internal combustion engine is large, and the heat generation rate given when the first fuel is combusted (first heat generation rate) is high, then the combustion of the second fuel is more facilitated in the multi-fuel internal combustion engine. The more the combustion of the second fuel is facilitated, the higher the heat generation rate given when the second fuel is combusted becomes. As a result, the heat generation rate given when the fuels are actually combusted in the multi-fuel internal combustion engine (actual heat generation rate: heat generation rate given when the first fuel and the second fuel are combusted) is increased.

Therefore, in a case when the first heat generation rate is high, the difference between the actual heat generation rate and the first heat generation rate becomes larger than that in a case when the first heat generation rate is low. Further, the magnitude of the difference between the actual heat generation rate and the first heat generation rate is equivalent to the magnitude of the heat generation rate given when the second fuel is combusted. In other words, the larger the difference between the actual heat generation rate and the first heat generation rate, the larger the heat generation rate given when the second fuel is combusted becomes.

In view of the above, in the present invention, the supply amount of the first fuel is adjusted by the first fuel supply amount adjusting unit so that the difference between the actual heat generation rate and the first heat generation rate results in the predetermined target value. In other words, when the difference between the actual heat generation rate and the first heat generation rate is larger than the predetermined target value, the supply amount of the first fuel is decreased. On the other hand, when the difference between the actual heat generation rate and the first heat generation rate is smaller than the predetermined target value, the supply amount of the first fuel is increased.

The larger the difference between the actual heat generation rate and the first heat generation rate, the smaller the amount of the unburned fuel components derived from the second fuel. However, in order to increase the difference between the actual heat generation rate and the first heat generation rate, it is necessary to increase the first heat generation rate, i.e. it is necessary to increase the supply amount of the first fuel. In this context, the "predetermined target value", which is referred to in the present invention, is the value which is predetermined as such a value that the emission amount of the unburned fuel components is within a tolerable range and the consumption of the first fuel is within a tolerable range.

When the supply amount of the first fuel is adjusted as described above, it is possible to restrain the emission amount of the unburned fuel components while restraining the consumption of the first fuel with relatively high ignitability.

The fuel supply control system for the multi-fuel internal combustion engine according to the present invention may further comprise a second fuel supply amount adjusting unit. The second fuel supply amount adjusting unit decreases an amount of the second fuel supplied from the second fuel supply unit to the multi-fuel internal combustion engine or stops the supply of the second fuel from the second fuel supply unit to the multi-fuel internal combustion engine when the actual heat generation rate, which is calculated by the actual heat generation rate calculating unit, is not increased by more than a predetermined increase amount when the amount of the first fuel supplied from the first fuel supply unit to the multi-fuel internal combustion engine is increased by the first fuel supply amount adjusting unit.

When the property of the second fuel is inferior, there is a case that even when the supply amount of the first fuel is increased, the heat generation rate given when the second fuel is combusted is not raised to such an extent that the heat generation rate corresponds to the amount of increase. In this context, the "predetermined increase amount", which is referred to in the present invention, is the threshold value of the increase amount of the actual heat generation rate at which it is possible to determine that the property of the second fuel is normal.

According to the above, when the property of the second fuel is inferior, the supply amount of the second fuel is decreased or the supply of the second fuel is stopped. When the supply amount of the second fuel is decreased, the supply amount of the first fuel is increased. When the supply of the second fuel is stopped, the combustion mode in the multi-fuel internal combustion engine is switched into the mode in which only the first fuel is combusted. Therefore, it is possible to restrain the deterioration of the combustion condition in the multi-fuel internal combustion engine.

As for the multi-fuel internal combustion engine according to the present invention, it is possible to exemplify a compression ignition type internal combustion engine which can be operated by mixedly combusting diesel oil and compressed natural gas. In this case, the diesel oil corresponds to the first fuel, and the compressed natural gas corresponds to the second fuel. When the multi-fuel internal combustion engine according to the present invention is the compression ignition internal combustion engine as described above, it is possible to restrain the emission amount of unburned fuel components while restraining the consumption of diesel oil.

Effect of the Invention

According to the present invention, it is possible to restrain the emission amount of unburned fuel components while restraining the consumption of fuel with relatively high ignitability in the multi-fuel internal combustion engine.

MODE FOR CARRYING OUT THE INVENTION

A specified embodiment of the present invention will be explained below on the basis of the drawings. As for the size, the material, the shape, and the relative arrangement of the constitutive components, etc. described in the embodiments of the present invention, these are not intended to limit the technical scope of the invention thereto, unless otherwise specifically noted.

First Embodiment

Schematic Arrangement

Figure 1:
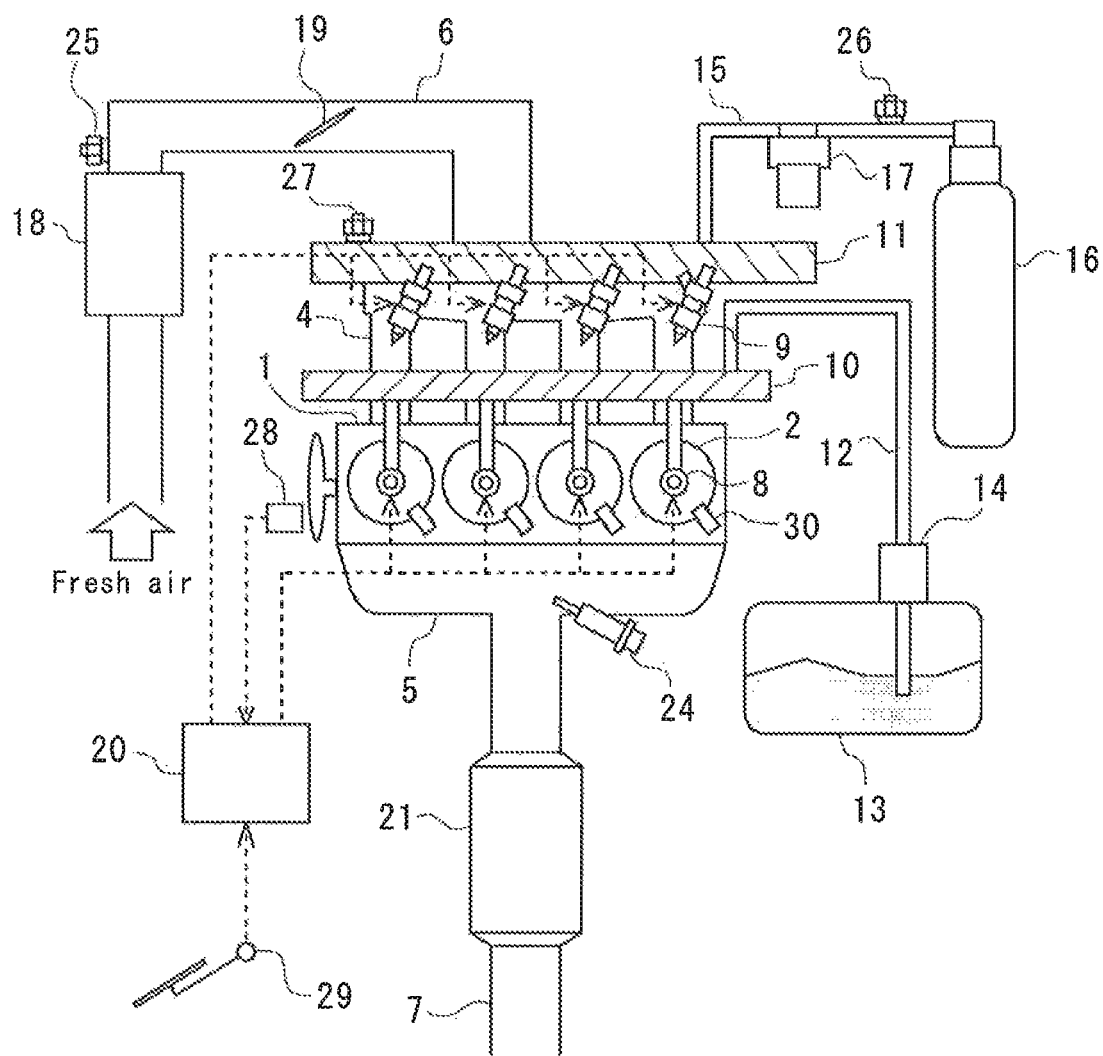
FIG. 1 shows a schematic arrangement of an internal combustion engine according to a first embodiment and a fuel system and an intake/exhaust system thereof.

FIG. 1 shows a schematic arrangement of an internal combustion engine according to this embodiment and a fuel system and an intake/exhaust system thereof. The internal combustion engine 1 is an engine for propelling a vehicle in which diesel oil and compressed natural gas (hereinafter referred to as "CNG") can be used as fuels. The internal combustion engine 1 is an engine of a compression ignition type. The internal combustion engine 1 can be operated by mixedly combusting diesel oil and CNG, as well as by combusting only diesel oil.

The internal combustion engine 1 has four cylinders 2. A diesel oil injector 8, which directly injects diesel oil into the cylinder 2, is disposed in each of the cylinders 2. A cylinder internal pressure sensor 30, which detects the pressure in the cylinder 2 (cylinder internal pressure), is disposed in each of the cylinders 2.

An intake manifold 4 and an exhaust manifold 5 are connected to the internal combustion engine 1. An intake passage 6 is connected to the intake manifold 4. An exhaust passage 7 is connected to the exhaust manifold 5. Four branch pipes of the intake manifold 4 are connected to intake ports of the cylinders 2 respectively. A CNG injector 9, which injects CNG, is disposed in each of the branch pipes. The CNG injector 9 can be the one that injects CNG into the intake port of each of the cylinders 2 to which each of the branch pipes of the intake manifold 4 is connected.

Each of the diesel oil injectors 8 is connected to a diesel oil common rail 10. One end of a diesel oil supply passage 12 is connected to the diesel oil common rail 10. The other end of the diesel oil supply passage 12 is connected to a diesel tank 13. A pump 14 is disposed in the diesel oil supply passage 12. The diesel oil is fed under pressure by the pump 14 from the diesel oil tank 13 via the diesel oil supply passage 12 to the diesel oil common rail 10. The diesel oil, which is pressurized in the diesel, oil common rail 10, is supplied to the respective diesel oil injectors 8.

Each of the CNG injectors 9 is connected to a CNG delivery pipe 11. One end of a CNG supply passage 15 is connected to the CNG delivery pipe 11. The other end of the CNG supply passage 15 is connected to a CNG tank 16. CNG is supplied from the CNG tank 16 via the CNG supply passage 15 to the CNG delivery pipe 11. Further, CNG is supplied from the CNG delivery pipe 11 to each of the respective CNG injectors 9.

A regulator 17 is disposed on the CNG supply passage 15. The pressure of CNG supplied to the CNG delivery pipe 11 is adjusted by the regulator 17. Pressure sensors 26, 27 for detecting the pressure of CNG are disposed on the upstream side from the regulator 17 of the CNG supply passage 15 and on the CNG delivery pipe 11.

When the internal combustion engine 1 is operated by mixedly combusting diesel oil and CNG, CNG is firstly injected from the CNG injectors 9 into each of the branch pipes of the intake manifold 4. Accordingly, a pre-mixed air-fuel mixture of intake air and CNG is formed, and the pre-mixed air-fuel mixture is supplied into the cylinders 2. Further, diesel oil is injected from the diesel oil injectors 8 into the cylinders 2 at around the compression top dead center, then the diesel oil is subjected to self-ignition. The propagation of the flame in the combustion chamber, which is formed by the self-ignition of the diesel oil, causes the diesel oil and CNG to combust.

An air cleaner 18, an air flow meter 25, and a throttle valve 19 are disposed on the intake passage 6 in this order from the upstream side along the flow of fresh air. A diesel oil injector 24 for injecting diesel oil into the exhaust gas is disposed on the exhaust manifold 5. An exhaust gas purification apparatus 21 is disposed on the exhaust passage 7. The exhaust gas purification apparatus 21 is composed of an exhaust gas purification catalyst, such as an oxidation catalyst, an absorption reduction type NOx catalyst or the like, a particulate filter for collecting particulate matters in the exhaust gas, etc.

An electronically controlled unit (ECU) 20 is provided in combination with the internal combustion engine 1. The air flow meter 25 and the pressure sensors 26, 27 are electrically connected to the ECU 20. Further, a crank angle sensor 28 and an accelerator opening degree sensor 29 are electrically connected to the ECU 20.

The crank angle sensor 28 detects the crank angle of the internal combustion engine 1. The accelerator opening degree sensor 29 detects the accelerator opening degree of the vehicle which carries the internal combustion engine 1. Output signals of the respective sensors are inputted into the ECU 20. The ECU 20 derives the engine rotation speed of the internal combustion engine 1 on the basis of the output signal of the crank angle sensor 28, and the ECU 20 derives the engine load of the internal combustion engine 1 on the basis of the output signal of the accelerator opening degree sensor 29.

The diesel oil injectors 8, the CNG injectors 9, the pump 14, the regulator 17, the throttle valve 19, and the diesel oil injector 24 are electrically connected to the ECU 20. These devices are controlled by the ECU 20.

The ECU 20 selects either a mixed combustion of diesel oil and CNG or a combustion of only diesel oil as the combustion mode on the basis of the operation condition of the internal combustion engine 1. Further, the ECU 20 controls the diesel oil injectors 8 and the CNG injectors 9 in accordance with the selected combustion mode.

Heat Generation Rate

Figure 2:
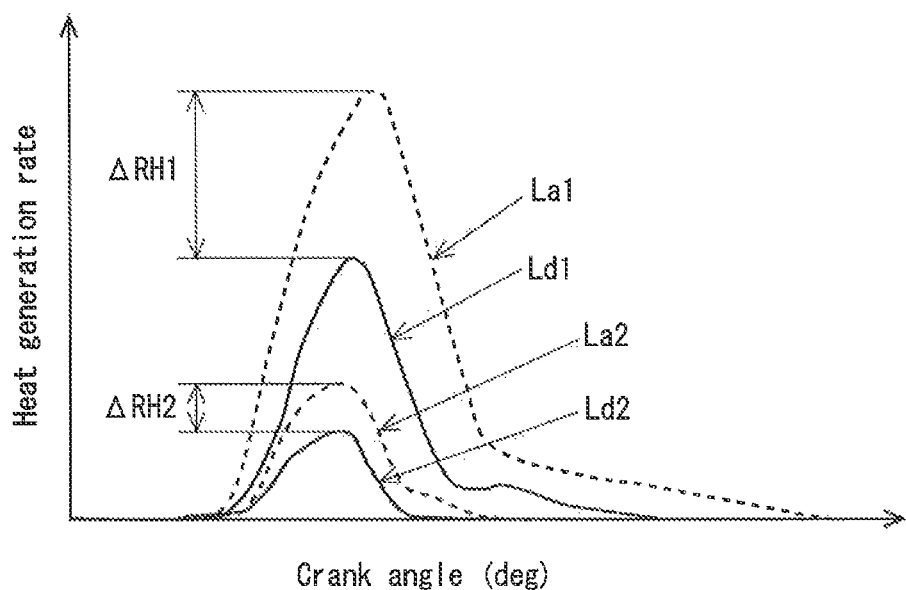
FIG. 2 shows the transition of the heat generation rate during the combustion of the fuels in a cylinder according to the first embodiment.

An explanation will be made on the basis of FIG. 2 about the heat generation rate of diesel oil and CNG when they are mixedly combusted in the internal combustion engine 1. FIG. 2 shows the transition of the heat generation rate of the fuels combusted in the cylinder 2 according to this embodiment. In FIG. 2, the horizontal axis represents the crank angle, and the vertical axis represents the heat generation rate.

With reference to FIG. 2, the solid lines Ld1, Ld2 indicate the heat generation rates of the fuels when only the diesel oil is combusted, and the broken lines La1, La2 indicate the heat generation rates of the fuels when the same amounts of diesel oil as those in the combustions shown by the solid lines Ld1, Ld2 and CNG are combusted. Further, the solid line Ld1 and the broken line La1 indicate the heat generation rates given when the amount of diesel oil injected from the diesel oil injector 8 is relatively large, and the solid line Ld2 and the broken line La2 indicate the heat generation rates given when the amount of diesel oil injected from the diesel oil injector 8 is relatively small.

Since the ignitability of CNG is extremely low, even when CNG is compressed in the cylinder 2 during a compression stroke, CNG is scarcely subjected to the self-ignition. Therefore, as described above, the combustion of CNG is done by using diesel oil as the ignition source. In other words, CNG is combusted by the heat generated when diesel oil is combusted by compression and self-ignition.

Therefore, the larger the quantity of heat generated by the combustion of diesel oil, i.e. the higher the heat generation rate given when the diesel oil is combusted, the more facilitated the combustion of CNG becomes. The more the combustion of CNG is facilitated, the more the quantity of heat generated by the combustion of CNG increases. As a result, the heat generation rate given when the diesel oil and CNG are combusted is increased.

According to this, as shown in FIG. 2, in a case when the injection amount of diesel oil is relatively large, i.e. when the heat generation rate given when the diesel oil is combusted is high, the difference $\Delta RH$ (hereinafter referred to as "heat generation rate peak difference"), which is a difference between the peak value of the heat generation rate given when the diesel oil and CNG are combusted and the peak value of the heat generation rate given when only the diesel oil is combusted, becomes larger ($\Delta RH1 > \Delta RH2$) than that in a case when the injection amount of diesel oil is relatively small, i.e. the heat generation rate given when the diesel oil is combusted is low. In other words, the ratio of increase of the peak value of La1 with respect to the peak value of La2 is larger than the ratio of increase of the peak value of Ld1 with respect to the peak value of Ld2 as shown in FIG. 2.

The magnitude of the heat generation rate peak difference $\Delta RH$ is equivalent to the magnitude of the heat generation rate of the combusted CNG. Thus, the larger the heat generation rate peak difference $\Delta RH$, the larger the heat generation rate given when the CNG is combusted becomes.

Figure 3:
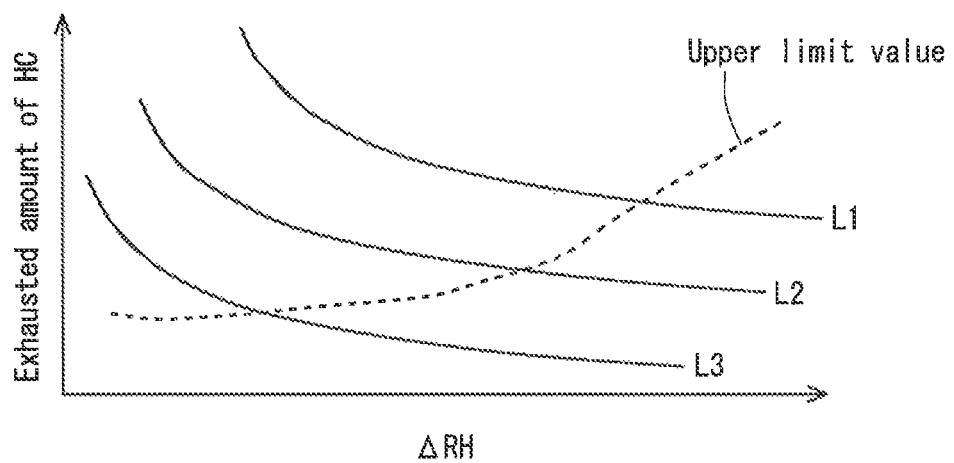
FIG. 3 shows a relationship between the heat generation rate peak difference $\Delta RH$ and the emission amount of the unburned fuel component (HC) from the internal combustion engine according to the first embodiment.

FIG. 3 shows a relationship between the heat generation rate peak difference $\Delta RH$ and the emission amount of the unburned fuel component (HC) from the internal combustion engine 1 according to this embodiment. In FIG. 3, the horizontal axis represents the heat generation rate peak difference $\Delta RH$, and the vertical axis represents the emission amount of HC. In FIG. 3, the solid line L1 indicates the emission amount of HC during a low load operation, the solid line L2 indicates the emission amount of HC during a middle load operation, and the solid line L3 indicates the emission amount of HC during a high load operation. Further, in FIG. 3 the broken line indicates the upper limit value of the tolerable range of the emission amount of HC.

The larger the heat generation rate peak difference ΔRH, the larger the combustion amount of CNG. Therefore, the amount of HC derived from CNG is small. Thus, as shown in FIG. 3, the larger the heat generation rate peak difference ΔRH, the more the emission amount of HC decreases.

Fuel Injection Control

Next, an explanation will be made about the fuel injection control performed when diesel oil and CNG are mixedly combusted in this embodiment. The heat generation rate given when the diesel oil and CNG are combusted in the internal combustion engine 1, i.e. the heat generation rate given when the fuels are actually combusted in the internal combustion engine 1 (actual heat generation rate), can be calculated on the basis of the detected values of the cylinder internal pressure sensors 30. However, when diesel oil and CNG are mixedly combusted, it is difficult to calculate the heat generation rate resulting from the combustion of diesel oil and the heat generation rate resulting from the combustion of CNG respectively on the basis of the detected values of the cylinder internal pressure sensors 30.

However, the heat generation rate given when assuming that only the diesel oil injected from the diesel oil injectors 8 is combusted (hereinafter referred to as "diesel oil heat generation rate") can be estimated on the basis of the injection amount of diesel oil, the operation condition of the internal combustion engine 1, etc.

In view of the above, in this embodiment, the peak value of the actual heat generation rate is calculated on the basis of the detected values of the cylinder internal pressure sensors 30, and the diesel oil heat generation rate is estimated on the basis of the injection amount of diesel oil and the operation condition of the internal combustion engine 1. Further, the heat generation rate peak difference ΔRH is calculated by subtracting the peak value of the diesel oil heat generation rate from the peak value of the actual heat generation rate, and the diesel oil injection amount from the diesel oil injectors 8 is adjusted on the basis of the heat generation rate peak difference ΔRH.

When the heat generation rate peak difference ΔRH is increased, the emission amount of the unburned fuel components decreases. However, in order to increase the heat generation rate peak difference ΔRH, the diesel oil heat generation rate needs to be increased, i.e. the diesel oil injection amount needs to be increased. Therefore, if the heat generation rate peak difference ΔRH is increased beyond necessity, it is feared that the consumption of diesel oil may be excessively increased.

Therefore, in this embodiment, the diesel oil injection amount from the diesel oil injectors 8 is adjusted so that the heat generation rate peak difference ΔRH results in a predetermined target value. In this context, the predetermined target value is the value which is predetermined on the basis of, for example, an experiment, as the value that the emission amount of the unburned fuel components is within a tolerable range and the consumption of diesel oil is within a tolerable range. When the diesel oil injection amount from the diesel oil injectors 8 is adjusted as described above, it is possible to restrain the emission amount of the unburned fuel components while restraining the consumption of diesel oil.

Figure 4:
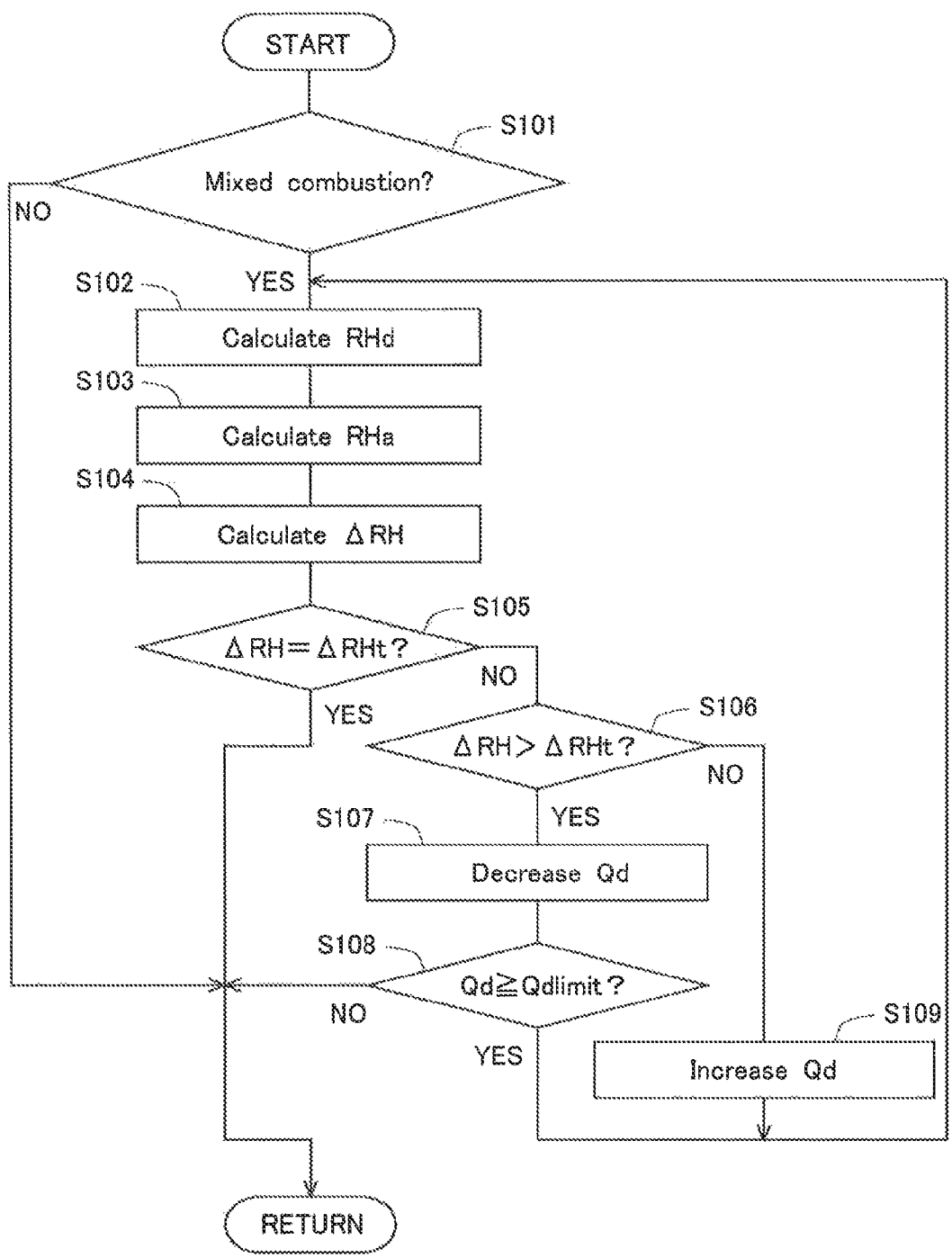
FIG. 4 shows a flow chart illustrating a flow of the fuel injection control performed when diesel oil and CNG are mixedly combusted in the internal combustion engine according to the first embodiment.

FIG. 4 shows a flow chart illustrating a flow of the fuel injection control performed when diesel oil and CNG are mixedly combusted in the internal combustion engine 1 according to this embodiment. This flow is stored in the ECU 20 beforehand and is repeatedly executed by the ECU 20.

In this flow, at first, in Step S101, whether or not the combustion mode in the internal combustion engine 1 is a mixed combustion of diesel oil and CNG is determined. If a negative determination is made in Step S101, the execution of this flow is once terminated.

On the other hand, if an affirmative determination is made in Step S101, the peak value RHd of the diesel oil heat generation rate is subsequently calculated in Step S102 on the basis of the diesel oil injection amount from the diesel oil injectors 8 and the operation condition of the internal combustion engine 1. The relationship among the diesel oil injection amount from the diesel oil injectors 8, the operation condition of the internal combustion engine 1 and the peak value RHd of the diesel oil heat generation rate is stored as a map or a function in the ECU 20 beforehand. In Step S102, the peak value RHd of the diesel oil heat generation rate is calculated by using the map or the function.

Subsequently, in Step S103, the peak value RHa of the actual heat generation rate is calculated on the basis of the detected values of the cylinder internal pressure sensors 30. The relationship between the cylinder internal pressure and the actual heat generation rate is stored as a map or a function in the ECU 20 beforehand. In Step S103, the peak value RHa of the actual heat generation rate is calculated by using the map or the function.

Subsequently, in Step S104, the heat generation rate peak difference ΔRH is calculated by subtracting the peak value RHd of the diesel oil heat generation rate calculated in Step S102 from the peak value RHa of the actual heat generation rate calculated in Step S103. Subsequently, in Step S105, whether or not the heat generation rate peak difference ΔRH is the same as the predetermined target value ΔRHt is determined.

As shown in FIG. 3, the tolerable range of the emission amount of the unburned fuel components changes depending on the operation condition of the internal combustion engine 1. Therefore, the target value ΔRHt of the heat generation rate peak difference is the value which is changed depending on the operation condition of the internal combustion engine 1. The relationship between the target value ΔRHt of the heat generation rate peak difference and the operation condition of the internal combustion engine 1 is stored as a map or a function, in the ECU 20 beforehand. Thus, the target value ΔRHt of the heat generation rate peak difference is set by using the map or the function.

If an affirmative determination is made in Step S105, this flow is once terminated. In this case, the diesel oil injection amount from the diesel oil injectors 8 is maintained at the present value. An affirmative determination may be made in Step S105 when the heat generation rate peak difference ΔRH is a value within a tolerable range from the target value ΔRHt, even when the heat generation rate peak difference ΔRH is not equal to the predetermined target value ΔRHt.

On the other hand, if a negative determination is made in Step S105, whether or not the heat generation rate peak difference ΔRH is larger than the predetermined target value ΔRHt is subsequently determined in Step S106. If an affirmative determination is made in Step S106, the diesel oil injection amount Qd from the diesel oil injectors 8 is subsequently decreased in Step S107. The decreasing amount in this step is determined beforehand.

Subsequently, in Step S108, whether or not the diesel oil injection amount Qd after the decrease is equal to or more than a predetermined lower limit value Qdlimit is determined. As described above, diesel oil serves as the ignition source. Therefore, if the diesel oil injection amount is excessively decreased, it is feared that a misfire may occur. The lower limit value Qdlimit of the diesel oil injection amount is the value which is determined on the basis of, for example, an experiment as the threshold value of the diesel oil injection amount at which it is possible to ensure a stable combustion. The lower limit value Qdlimit of the diesel oil injection amount is stored in the ECU 20 beforehand.

If an affirmative determination is made in Step S108, the process of Step S102 is subsequently executed again. On the other hand, if a negative determination is made in Step S108, the execution of this flow is once terminated. In this case, the diesel oil injection amount from the diesel oil injectors 8 is returned to the value given before it was decreased in Step S107.

If a negative determination is made in Step S106, it can be determined that the heat generation rate peak difference ΔRH is smaller than the predetermined target value ΔRHt. In this case, the diesel oil injection amount Qd from the diesel oil injectors 8 is subsequently increased in Step S109. The increasing amount in this step is determined beforehand. After the diesel oil injection amount Qd is increased, the process of Step S102 is executed again.

In this embodiment, diesel oil corresponds to the first fuel according to the present invention, and CNG corresponds to the second fuel according to the present invention. Further, the diesel oil injector 8 corresponds to the first fuel supply unit according to the present invention, and the CNG injector 9 corresponds to the second fuel supply unit according to the present invention. However, the multi-fuel internal combustion engine according to the present invention is not limited to the internal combustion engine which uses diesel oil and CNG as the fuels. The present invention is also applicable to any multi-fuel internal combustion engine which use any other self-ignitable fuel (for example, fuel oil, kerosene or the like) and any other fuel which requires ignition assistance (for example, gasoline, hydrogen or the like) for the fuels.

Further, in this embodiment, the ECU 20, which executes Step S102 in the flow described above, corresponds to the first heat generation amount estimating unit according to the present invention. Further, the ECU 20, which executes Step S103 in the flow described above, corresponds to the actual heat generation amount calculating unit according to the present invention. The ECU 20, which executes Steps S107 and S109, corresponds to the first fuel supply amount adjusting unit according to the present invention.

Modified Embodiment

Figure 5:
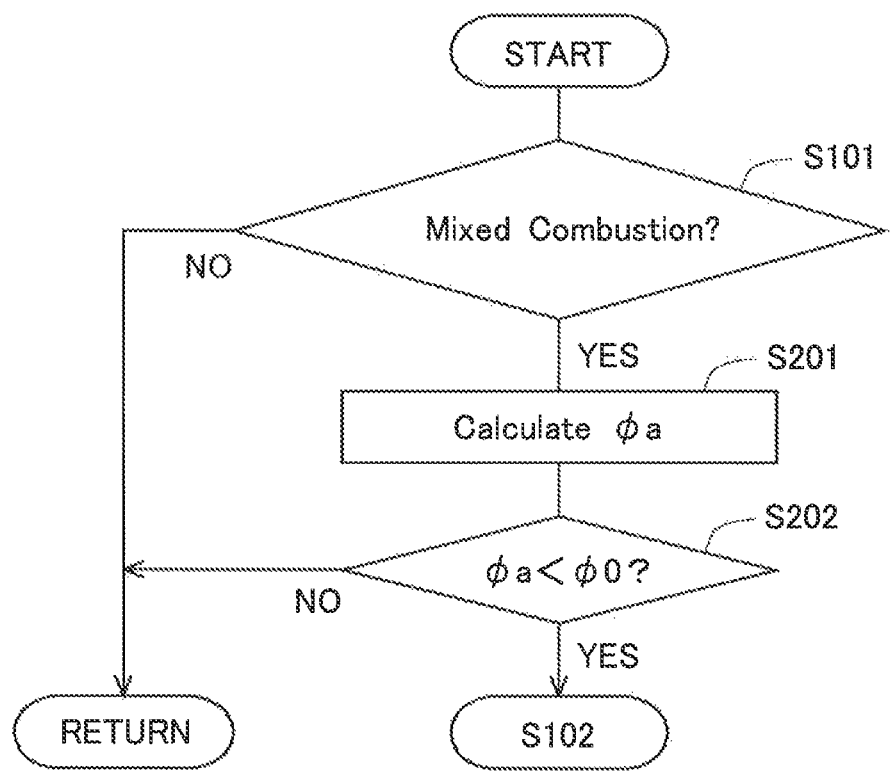
FIG. 5 shows a part of a flow chart illustrating a modified embodiment of the flow of the fuel injection control performed when diesel oil and CNG are mixedly combusted in the internal combustion engine according to the first embodiment.

FIG. 5 shows a part of a flow chart illustrating a modified embodiment of the flow of the fuel injection control performed when diesel oil and CNG are mixedly combusted in the internal combustion engine 1 according to this embodiment. Steps of this flow except for Steps S201 and S202 are similar to the respective steps of the flow chart shown in FIG. 4. Therefore, only the processes of Steps S201 and S202 will be explained, and the processes of the other steps will be omitted from the explanation. In FIG. 5, the steps after Step S102 are omitted from the illustration.

In this flow, if an affirmative determination is made in Step S101, the equivalence ratio φa of the air-fuel mixture in the cylinder 2 is subsequently calculated in Step S201 on the basis of the intake air amount detected by the air flow meter 25, the diesel oil injection amount and CNG injection amount.

Subsequently, whether or not the equivalence ratio φa of the air-fuel mixture in the cylinder 2 is smaller than a predetermined threshold value φ0 is determined. The smaller the equivalence ratio of the air-fuel mixture in the cylinder 2, the more unstable the combustion amount of CNG becomes. The predetermined threshold value φ0 is the value which is set as the lower limit value of the equivalence ratio at which CNG can be combusted stably. The threshold value φ0 is determined on the basis of, for example, an experiment, and the threshold value φ0 is stored in the ECU 20 beforehand.

If an affirmative determination is made in Step S202, the process of Step S102 is subsequently executed. On the other hand, if a negative determination is made in Step S202, the execution of this flow is once terminated.

When the operation condition of the internal combustion engine 1 is in such an operation range that CNG can be stably combusted, the necessity to conduct the adjustment of the diesel oil injection amount is low. According to the flow described above, the adjustment of the diesel oil injection amount can be conducted only when the operation condition of the internal combustion engine 1 is in such an operation range that the combustion amount of CNG is unstable.

Second Embodiment

The schematic arrangement of an internal combustion engine according to this embodiment, a fuel system and an exhaust system thereof is similar to the schematic arrangement of the internal combustion engine according to the first embodiment, the fuel system and the exhaust system thereof.
Fuel Injection Control Also in this embodiment, when diesel oil and CNG are mixedly combusted in the internal combustion engine 1, the adjustment of the diesel oil injection amount, which is based on the heat generation rate peak difference, is conducted similarly to that in the first embodiment. It is assumed that the property of CNG may be uneven. In a case when the property of CNG is inferior, if diesel oil and CNG are mixedly combusted, it is feared that the combustion condition may be consequently deteriorated.

In view of the above, in this embodiment, whether or not the property of CNG is inferior is determined. If it is determined that the property of CNG is inferior, then the injection of CNG from the CNG injectors 9 is stopped, and the combustion mode of the internal combustion engine 1 is switched into the mode in which only diesel oil is combusted.

Determining whether or not the property of CNG is inferior is done on the basis of the increased amount of the actual heat generation rate that is increased when the diesel oil injection amount is increased while diesel oil and CNG are mixedly combusted in the internal combustion engine 1. In a case when the property of CNG is inferior, even when the quantity of heat is increased by increasing the diesel oil injection amount, the combustion amount of CNG is not increased as much as that in a case when the property of CNG is normal. Therefore, the increasing amount of the actual heat generation rate is small.

Therefore, in this embodiment, when the increasing amount of the actual heat generation rate given when the diesel oil injection amount is increased is smaller than a predetermined increase amount, it is determined that the property of CNG is inferior. In this context, the predetermined increasing amount is the threshold value of the increase amount of the actual heat generation rate at which it is possible to determine that the property of CNG is normal. The predetermined increase amount is determined on the basis of, for example, an experiment as the value corresponding to the increase amount provided when the diesel oil injection amount is increased, and the predetermined increase amount is stored in the ECU 20 beforehand.

Figure 6:
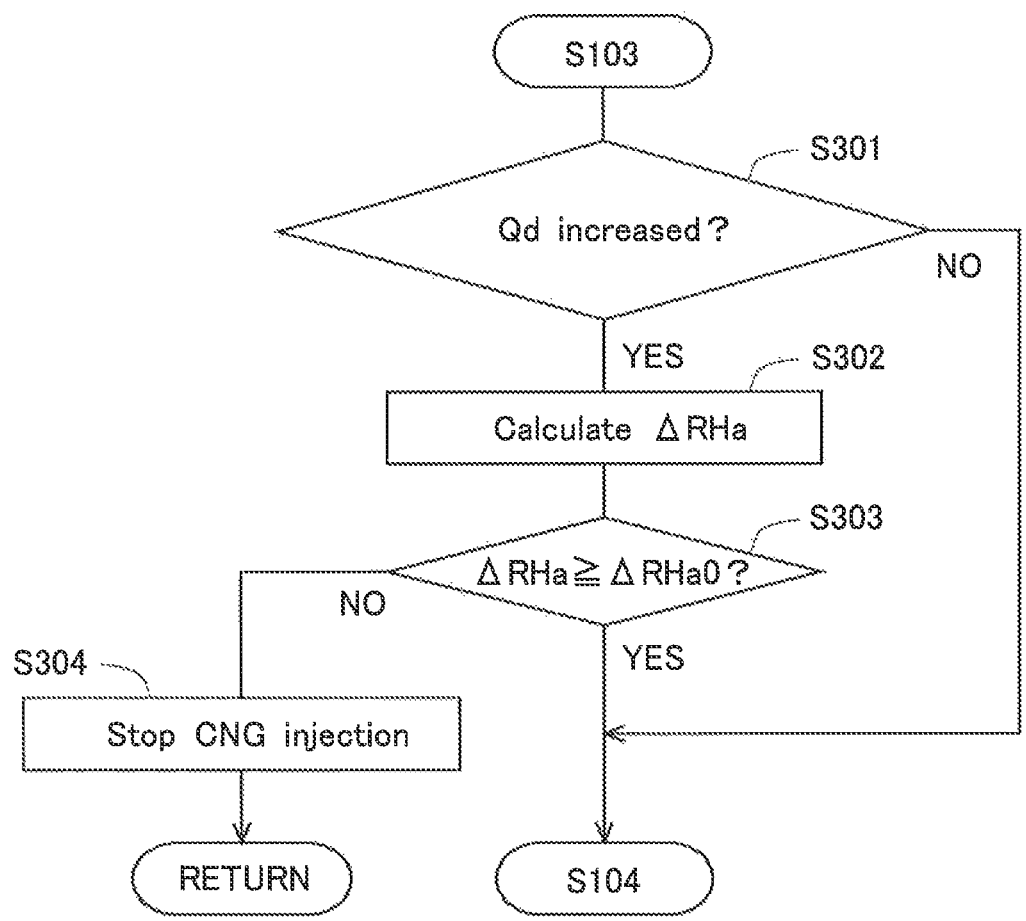
FIG. 6 shows a part of a flow chart illustrating a flow of the fuel injection control performed when diesel oil and CNG are mixedly combusted in an internal combustion engine according to a second embodiment.

FIG. 6 shows a part of a flow chart illustrating a flow of the fuel injection control performed when diesel oil and CNG are mixedly combusted according to this embodiment. Steps of this flow except for Steps S301 to S304 are similar to the respective steps of the flow chart shown in FIG. 4. Therefore, only the processes of Steps S301 to S304 will be explained, and the processes of the other steps will be omitted from the explanation. In FIG. 6, the steps before Step S103 and the steps after Step S104 are omitted from the illustration.

In this flow, after the process of Step S103, in Step S301, whether or not the diesel oil injection amount Qd from the diesel oil injector 8 is increased is determined, i.e. whether or not the process of Step S109 is performed is determined. If a negative determination is made in Step S301, the process of Step S104 is subsequently executed.

On the other hand, if an affirmative determination is made in Step S301, the increase amount of the actual heat generation rate ΔRHa, which is increased before and after the increase of the diesel oil injection amount in Step S109, is subsequently calculated in Step S302. Subsequently, in Step S303, whether or not the increase amount ΔRHa of the actual heat generation rate is equal to or more than a predetermined increase amount ΔRHa0 is determined.

If an affirmative determination is made in Step S303, the process of Step S104 is subsequently executed. On the other hand, if a negative determination is made in Step S303, then the injection of CNG from the CNG injectors 9 is subsequently stopped in Step S304, and the combustion mode of the internal combustion engine 1 is switched into the mode in which only diesel oil is combusted. In this case, in order to compensate the injection amount of CNG, the diesel oil injection amount Qd from the diesel oil injectors 8 is further increased.

According to the flow described above, if the property of CNG is inferior, the supply of CNG to the internal combustion engine 1 is stopped. Therefore, it is possible to restrain the deterioration of the combustion condition of the internal combustion engine 1.

In Step S304 in the flow described above, the CNG injection from the CNG injectors 9 does not necessarily need to be stopped. If the deterioration of the combustion condition of the internal combustion engine 1 can be restrained by decreasing the CNG injection amount, then the injection amount may be decreased while continuing the CNG injection from the CNG injectors 9. Also in this case, in order to compensate the decreased CNG injection amount, the diesel oil injection amount Qd from the diesel oil injectors 8 is further increased.

In this embodiment, the ECU 20, which executes Step S304 in the flow described above, corresponds to the second fuel supply amount adjusting unit according to the present invention.

EXPLANATION OF REFERENCES

1: internal combustion engine, 2: cylinder, 8: diesel oil injector, 9: CNG injector, 20: ECU, 21: exhaust gas purification apparatus, 25: air flow meter, 28: crank angle sensor, 29: accelerator opening degree sensor, 30: cylinder internal pressure sensor.

The invention claimed is:

1. A fuel supply control system for a multi-fuel internal combustion engine in which a first fuel with relatively high ignitability and a second fuel with relatively low ignitability are used as fuels and the first fuel is used as an ignition source to mixedly combust the first fuel and the second fuel, the fuel supply control system for the multi-fuel internal combustion engine comprising:
 a first fuel supply unit which supplies the first fuel to the multi-fuel internal combustion engine;
 a second fuel supply unit which supplies the second fuel to the multi-fuel internal combustion engine;
 a first heat generation rate estimating unit which estimates a first heat generation rate, the first heat generation rate being a heat generation rate given when assuming that only the first fuel supplied from the first fuel supply unit is combusted in the multi-fuel internal combustion engine;
 an actual heat generation rate calculating unit which calculates an actual heat generation rate, the actual heat generation rate being a heat generation rate given when the fuels are actually combusted in the multi-fuel internal combustion engine; and
 a first fuel supply amount adjusting unit which adjusts an amount of the first fuel supplied from the first fuel supply unit to the multi-fuel internal combustion engine so that a difference between the actual heat generation rate calculated by the actual heat generation rate calculating unit and the first heat generation rate estimated by the first heat generation rate estimating unit results in a predetermined target value,
 wherein the first fuel supply amount adjusting unit decreases the amount of the first fuel supplied from the first fuel supply unit to the multi-fuel internal combustion engine when the difference between the actual heat generation rate and the first heat generation rate is larger than the predetermined target value, and increases the amount of the first fuel supplied from the first fuel supply unit to the multi-fuel internal combustion engine when the difference between the actual heat generation rate and the first heat generation rate is smaller than the predetermined target value.

2. The fuel supply control system for the multi-fuel internal combustion engine according to claim 1, further comprising a second fuel supply amount adjusting unit which stops the supply of the second fuel from the second fuel supply unit to the multi-fuel internal combustion engine when the actual heat generation rate, which is calculated by the actual heat generation rate calculating unit, is not increased by more than a predetermined increase amount when the amount of the first fuel supplied from the first fuel supply unit to the multi-fuel internal combustion engine is increased by the first fuel supply amount adjusting unit.

3. The fuel supply control system for the multi-fuel internal combustion engine according to claim 1, further comprising a second fuel supply amount adjusting unit which decreases an amount of the second fuel supplied from the second fuel supply unit to the multi-fuel internal combustion engine when the actual heat generation rate, which is calculated by the actual heat generation rate calculating unit, is not increased by more than a predetermined increase amount when the amount of the first fuel supplied from the first fuel supply unit to the multi-fuel internal combustion engine is increased by the first fuel supply amount adjusting unit.

4. The fuel supply control system for the multi-fuel internal combustion engine according to claim 1,
 wherein the first heat generation rate estimating unit estimates a peak value of the first heat generation rate,
 the actual heat generation rate calculating unit calculates a peak value of the actual heat generation rate,
 the first fuel supply amount adjusting unit adjusts an amount of the first fuel supplied from the first fuel supply unit to the multi-fuel internal combustion engine so that a difference between the peak value of the actual heat generation rate calculated by the actual heat generation rate calculating unit and the peak value of the first heat generation rate estimated by the first heat generation rate estimating unit results in a predetermined target value, wherein the first fuel supply amount adjusting unit decreases the amount of the first fuel supplied from the first fuel supply unit to the multi-fuel internal combustion engine when the difference between the peak value of the actual heat generation rate and the peak value of the first heat generation rate is larger than the predetermined target value, and increases the amount of the first fuel supplied from the first fuel supply unit to the multi-fuel internal combustion engine when the difference between the peak value of the actual heat generation rate and the peak value of the first heat generation rate is smaller than the predetermined target value.

* * * * *